(12) United States Patent
Koyama (10) Patent No.: US 6,282,381 B1
(45) Date of Patent: Aug. 28, 2001

(54) REAL-IMAGE FINDER AND OPTICAL DEVICE HAVING THE SAME

(75) Inventor: Takeshi Koyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/419,095

(22) Filed: Oct. 15, 1999

(30) Foreign Application Priority Data

Oct. 21, 1998 (JP) .................................................. 10-318404

(51) Int. Cl.$^7$ .................................................. G03B 13/02
(52) U.S. Cl. .......................................... 396/384; 359/834
(58) Field of Search ............................ 396/384; 359/643, 359/831, 834, 836

(56) References Cited

U.S. PATENT DOCUMENTS

| | | | |
|---|---|---|---|
| 4,171,888 | * 10/1979 | Shono et al. | 396/384 |
| 4,592,636 | * 6/1986 | Kato et al. | 396/384 |
| 4,609,272 | * 9/1986 | Yokota et al. | 396/384 |
| 4,949,107 | 8/1990 | Kitagishi et al. | 354/79 |
| 5,253,005 | 10/1993 | Koyama et al. | 354/152 |
| 5,392,082 | 2/1995 | Ikemori et al. | 354/195.12 |
| 5,640,632 | 6/1997 | Koyama et al | 396/382 |
| 5,751,409 | 5/1998 | Koyama | 356/3.14 |

* cited by examiner

Primary Examiner—David M. Gray
(74) Attorney, Agent, or Firm—Fitzpatrick, Cella, Harper & Scinto (57) ABSTRACT

In a real-image finder, an objective optical system forms a real image and a reflecting member has a surface that reflects light from the objective optical system. A transmissive prism that transmits light from the reflecting member has an incident surface on which a light beam from the reflecting member is nearly perpendicularly incident and an emergent surface at an angle to the incident surface. The light from the transmissive prism is incident on an incident surface of a reflecting prism placed close to the emergent surface of the transmissive prism. A reflecting surface of the reflecting prism reflects light from the reflecting surface so that the light reflected from the reflecting surface is totally reflected by the reflecting prism incident surface. An eyepiece optical system guides the light from the reflecting prism to an observer.

26 Claims, 5 Drawing Sheets

LIGHT BEAM

23
NARROW SPACE
23b

FIG. 4B

WASTED AREA
LIGHT BEAM

WASTED AREA
REFLECTING PRISM

REAL-IMAGE FINDER AND OPTICAL DEVICE HAVING THE SAME

BACKGROUND OF THE INVENTION

1. Field of the Invention

The present invention relates to a finder of an optical device, such as a camera, and more particularly, to a real-image finder.

2. Description of the Related Art

In recent years, size reduction of optical devices, such as cameras, has further advanced, and a principal object in this development is to reduce the space in the optical device occupied by the finder.

On the other hand, an increasing number of optical devices require switching of visual field masks of different sizes, and zooming of objective lens systems. In order to satisfy these requirements in a compact system, a real-image finder is most preferable.

The real-image finder requires an image-inverting optical system to allow viewing of an erect image. For the purpose of size reduction, an increasing number of image-inverting optical systems have a roof reflecting surface.

Figure 7:
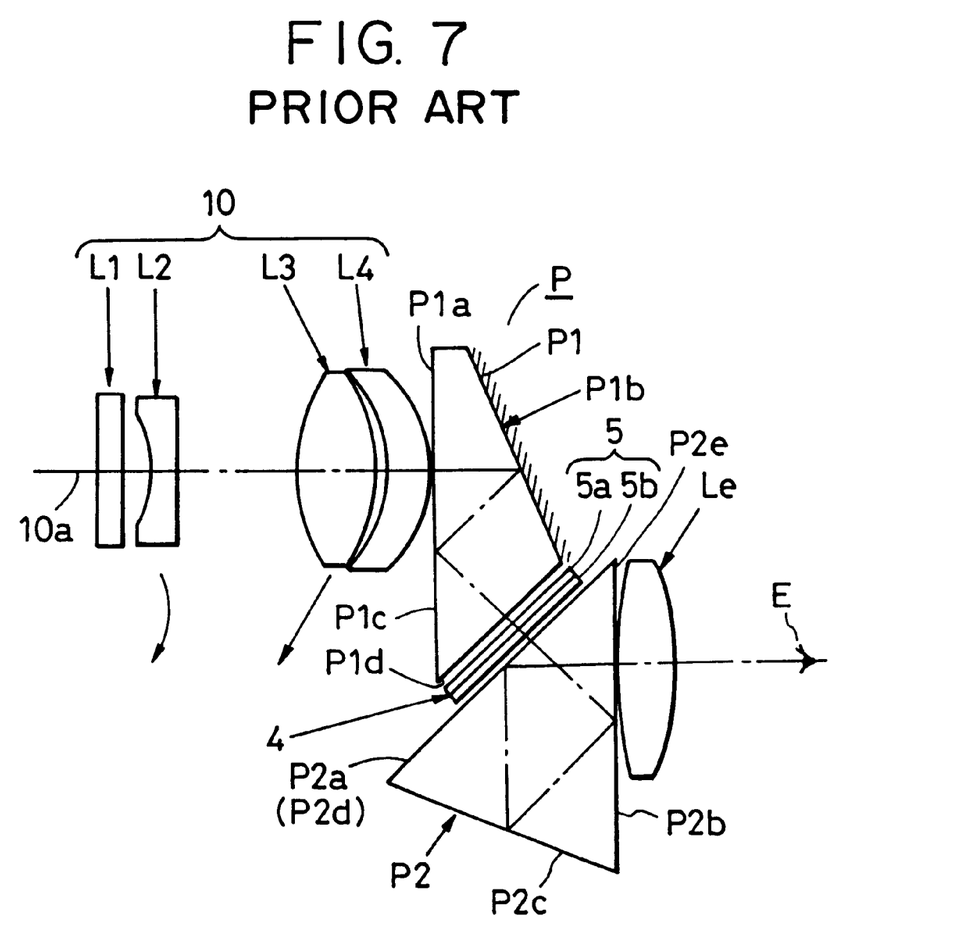
FIG. 7 is an explanatory view of a conventional image-inverting optical system.

FIG. 7 is a schematic structural view of a finder using a roof prism proposed in Japanese Patent Application Laid-Open No. 9-105863.

Referring to FIG. 7, the finder includes an objective lens 10 for forming an object image on a predetermined plane, an image-inverting optical system P composed of a triangular prism P1 and a roof prism P2, and an eyepiece Le having positive retracting power.

A light beam from the objective lens 10 enters an incident surface P1a of the triangular prism P1, is reflected by a surface P1b toward a surface P1c that is flush with the incident surface P1a, and is totally reflected by the surface P1c to emerge from an emergent surface P1d. The light beam from the emergent surface P1d enters an incident surface P2a of the roof prism P2 via an indication member 5 having a visual field frame and the like, is totally reflected by a surface P2b to enter a roof surface P2c, is reflected back in the direction perpendicular to the observation field, is totally reflected by a surface P2d that is flush with the incident surface P2a to emerge from an emergent surface P2e that is flush with the surface P2b, and is guided to an eyepoint E via the eyepiece Le.

In this way, an inverted object image formed by the objective lens 10 is inverted vertically and horizontally by the image-inverting optical system P, and is observed as an erect image from the eyepoint E via the eyepiece Le.

SUMMARY OF THE INVENTION

In view of such conventional art, an object of the present invention is to provide a more compact and higher-performance real-image finder.

In order to achieve the above object, according to an aspect of the present invention, there is provided a real-image finder including: an objective optical system for forming a real image; a reflecting member having a reflecting surface for reflecting light from the objective optical system; a transmissive prism for transmitting light from the reflecting member, the transmissive prism having an incident surface on which a light beam on the optical axis of the objective optical system deflected by the reflecting member is incident nearly perpendicularly, and an emergent surface placed at an angle to the incident surface; a reflecting prism on which light from the transmissive prism is incident, the reflecting prism having an incident surface placed close to the emergent surface of the transmissive prism, and a reflecting surface for reflecting light from the incident surface so that the light from the reflecting surface is totally reflected by the incident surface of the reflecting prism; and an eyepiece optical system for guiding light from the reflecting prism to an observer.

According to another aspect of the present invention, there is provided an optical device having the above-described real-image finder.

Further objects, features, and advantages of the present invention will become apparent from the following description of the preferred embodiments with reference to the attached drawings.

DESCRIPTION OF THE PREFERRED EMBODIMENTS

First Embodiment

Figure 1:
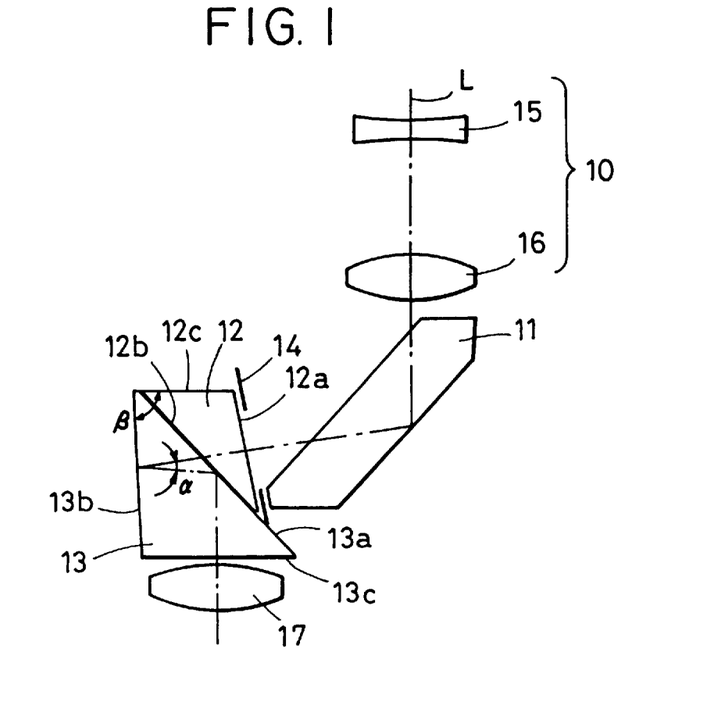
FIG. 1 is an explanatory view of a real-image finder according to a first embodiment of the present invention.

FIG. 1 shows a real-image finder according to a first embodiment of the present invention. Referring to FIG. 1, the real-image finder of this embodiment has a roof mirror 11 serving as a first reflecting member, a transmissive prism 12, a reflecting prism 13, a visual field mask 14, a concave objective lens 15, a convex objective lens 16, and an eyepiece 17.

The concave objective lens 15 and the convex objective lens 16 are coaxially arranged in that order from the object side to constitute a so-called retrofocus objective lens system 10 having a long back focus. In FIG. 1, L represents the optical axis of the system 10.

A light beam passing through the objective lens system 10 is bent at an obtuse angle by the roof mirror 11, and enters the transmissive prism 12 from an incident surface 12a that is nearly perpendicular to the bent optical axis (the light beam along the optical axis).

An image plane of the objective lens system 10 is positioned adjacent to the incident surface 12a of the transmissive prism 12, and the visual field mask 14 is placed thereat.

The light beam that is incident on the transmissive prism 12 emerges from an emergent surface 12b diagonal to the optical axis. Therefore, the emergent surface 12b is diagonally placed at such an angle that the light beam is not totally reflected thereby.

Subsequently, the light beam enters the reflecting prism 13 from an incident surface 13a that is placed nearly parallel and in proximity to the emergent surface 12b. The light from the incident surface 13a is reflected at a predetermined acute angle α by a coated mirror surface 13b serving as a first reflecting surface of the reflecting prism 13, and the light from the first reflecting surface is totally reflected by the incident surface 13a through which the light has previously passed. The light beam totally reflected from the incident surface 13a thereby emerges from an emergent surface 13c toward the eyepiece 17, that is, in the direction opposite from the object side, and nearly in parallel with the optical axis L of the objective lens system 10 before being bent by the roof mirror 11 serving as the first reflecting member.

The light beam from the emergent surface 13c is guided to an observer via the eyepiece 17.

This allows the observer to view, through the eyepiece 17, an object image formed adjacent to the incident surface 12a of the transmissive prism 12 by the objective lens system 10, the visual field mask 14, and the like.

The angle α formed by the light beam incident on the reflecting surface 13b of the reflecting prism 13 and the light beam emergent therefrom is set to satisfy the following condition:

$$5°<\alpha<35° \qquad (1)$$

When the angle a is less than the lower limit of this condition, the width of the totally reflected light beam is reduced, that is, the pupil diameter is decreased, which makes it difficult to look through the finder. In contrast, when the angle a exceeds the upper limit, the size in the initial direction of the optical axis, that is, the total length increases, which hinders size reduction.

It is more preferable that the angle a be within the following range:

$$8°<\alpha<30° \qquad (2)$$

Since the width of the light beam increases from the image plane of the objective lens system toward the eyepiece, in order to minimize the size of the prism member, it is preferable that an angle β formed by an object-side surface 12c of the transmissive prism 12 and the first reflecting surface 13b of the reflecting prism 13 be an acute angle.

In this embodiment, the objective lens system 10 is made nearly telecentric, thereby removing a field lens.

As described above, in this embodiment, the transmissive prism 12 is used in order to properly set the incident angle of the light beam with respect to the reflecting prism 13, and to thereby reduce the total length for size reduction.

Figure 2:
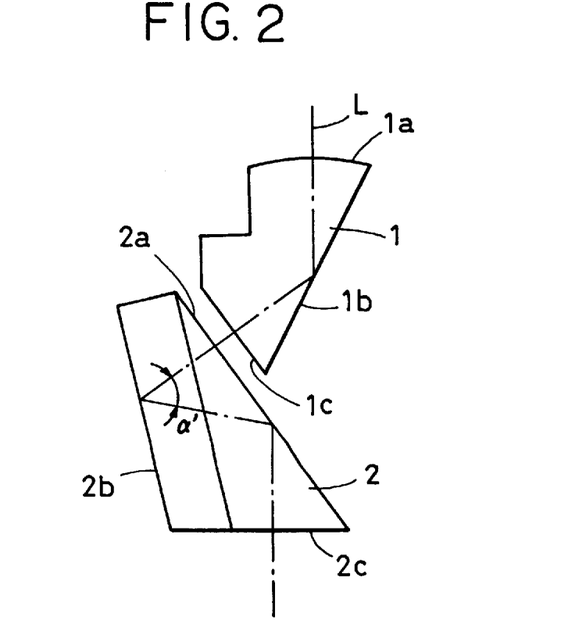
FIG. 2 is an explanatory view of a reference example in which a transmissive prism is not used.

In contrast, FIG. 2 shows a reference example of an image-inverting optical system that does not include a transmissive prism.

Referring to FIG. 2, a prism (reflecting member) 1 reflects a light beam from an objective lens system (not shown), and a roof prism 2 serving as a reflecting prism finally guides the light beam from the prism 1 to an eyepiece system (not shown). L represents the optical axis of the objective lens system.

A light beam from the objective lens system enters the prism 1 through an incident surface 1a, is totally reflected by a reflecting surface 1b, and emerges from an emergent surface 1c that is nearly perpendicular to the optical axis of the reflected light beam. The light beam enters the roof prism 2 through an incident surface 2a nearly parallel to the emergent surface 1c, and is reflected by a roof surface 2b of the roof prism 2 so that the optical axis in the incident direction and the optical axis in the reflected direction form a predetermined angle α'. Subsequently, the light beam is totally reflected by the incident surface 2a, and emerges from an emergent surface 2c of the roof prism 2 nearly in parallel with the optical axis of the light beam incident on the prism member 1, whereby an object image is viewed via an eyepiece (not shown). In this way, the image is inverted by the reflecting surface 1b, the roof surface 2b, and the total reflection surface (incident surface) 2a in this example, which allows the object image formed by the objective lens system to be viewed as an erect image.

In the above-described example, however, since the surface 2a of the roof prism 2, which is nearly perpendicular to the optical axis of the light beam reflected by the surface 1b of the prism 1, is also used as the total reflection surface, the angle α' of reflection from the surface 2b of the roof prism 2 must be relatively large (more than approximately 45° in the case of a normal prism material). As a result, the size of the overall system increases in the longitudinal direction, which has an adverse effect on size reduction of a camera or the like.

Accordingly, in the first embodiment of the present invention shown in FIG. 1, a light beam from the reflecting member 11 is first caused to enter the incident surface 12a of the transmissive prism 12 perpendicular thereto, and is caused to enter the incident surface 13a of the reflecting prism 13 via the emergent surface 12b spaced from the incident surface 13a with a small air space therebetween. For this reason, the angle of the total reflection surface (incident surface) 13a can be arbitrarily set, which eliminates the necessity to make the angle a large, and thereby achieves size reduction.

The above structures in this embodiment provide a compact and high-power real-image finder.

Second Embodiment

Figure 3:
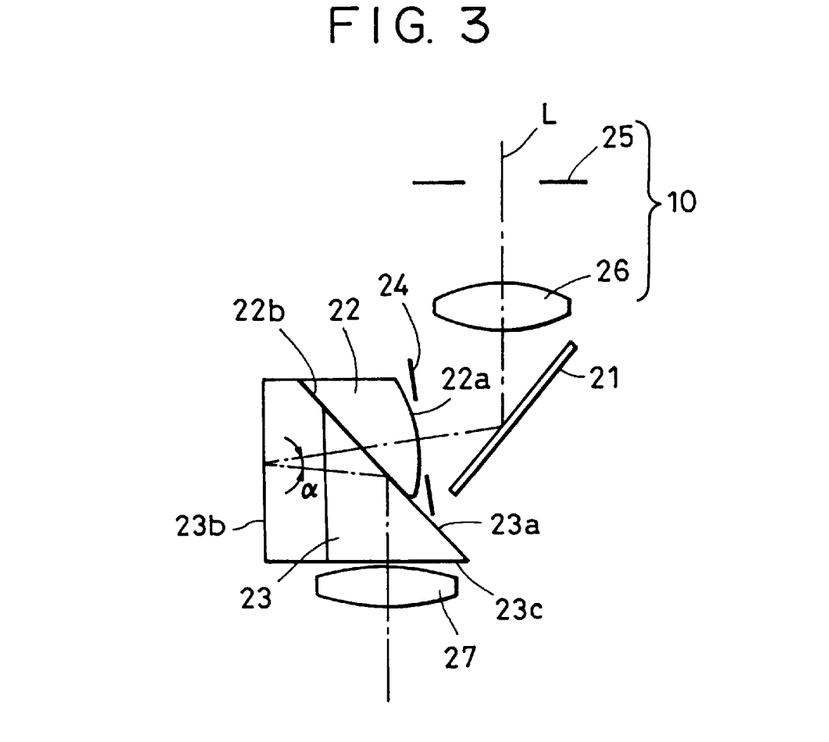
FIG. 3 is an explanatory view of a real-image finder according to a second embodiment of the present invention.

FIG. 3 shows a real-image finder according to a second embodiment of the present invention.

The second embodiment differs from the first embodiment in that an objective lens system 10 is composed of a front diaphragm 25 and a convex lens 26, in that a first reflecting means 21 is a plane mirror, in that an incident surface 22a of a transmissive prism 22 has positive refracting power, and in that a reflecting surface 23b of a reflecting prism 23 is a roof surface (other structures are similar to those in the first embodiment, and description thereof is therefore omitted).

Referring to the advantages peculiar to this embodiment, since the reflecting member 21 interposed between the objective lens system 10 and the image plane is formed of a plane mirror, the back focus of the objective lens system 10 can be made shorter than in the case of using a roof mirror. Moreover, the objective lens system 10 need not be of a retrofocus type, and may include only a convex lens.

Since the incident surface 22a of the transmissive prism 22 adjacent to the image plane has positive refracting power and serves as a field lens, it is unnecessary to make the objective lens system 10 telecentric. Therefore, it is possible to place the front diaphragm 25 and the convex lens 26 closer to each other than in the telecentric structure, and to make the outer shape of the convex lens 26 smaller.

Figure 4A:
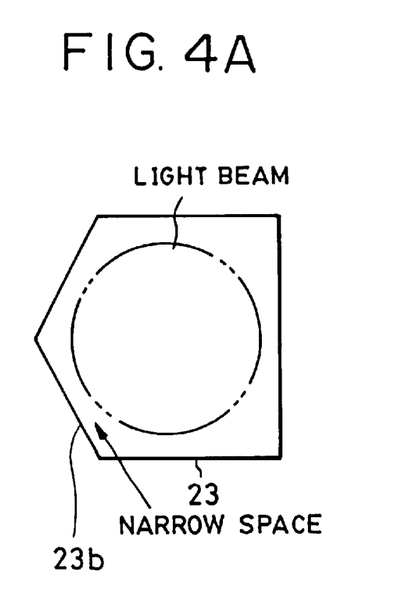
FIGS. 4A and 4B are explanatory views of a reflecting prism, as viewed from the side of an eyepiece.
Figure 4B:
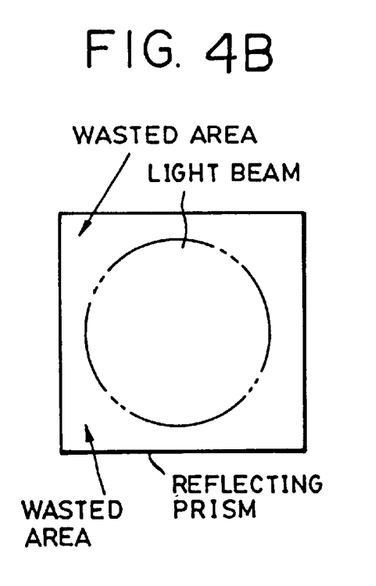

The roof surface 23b of the reflecting prism 23 is disposed on the side of an eyepiece 27 in this embodiment, as shown in FIG. 4A, and matches the light beam having a circular cross section better than in a case in which the side face is planar (FIG. 4B), which makes it possible to efficiently use the space.

Third Embodiment

Figure 5:
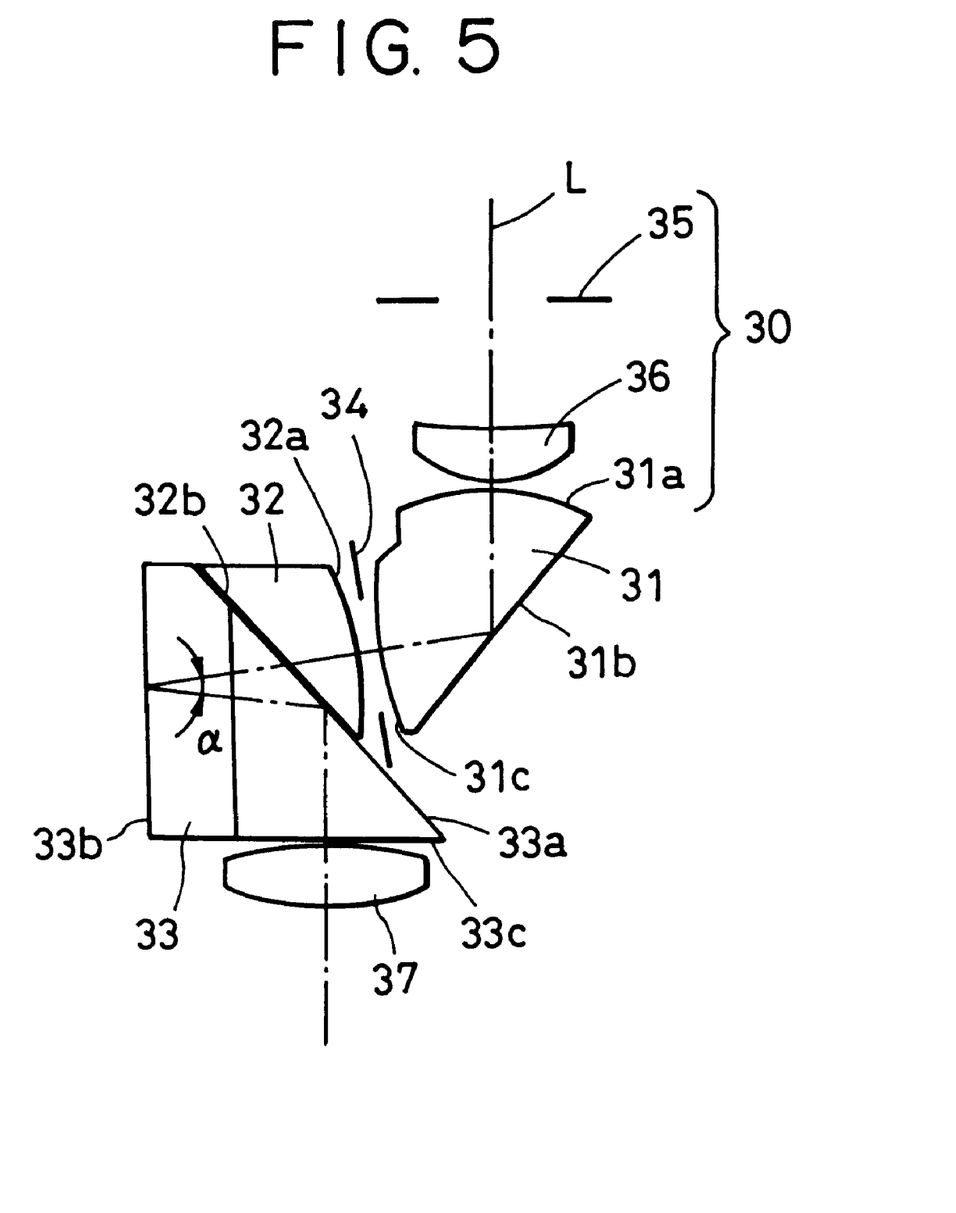
FIG. 5 is an explanatory view of a real-image finder according to a third embodiment of the present invention.

FIG. 5 shows a real-image finder according to a third embodiment of the present invention.

The third embodiment differs from the second embodiment in that a reflecting member 31 is formed of a prism including an incident surface 31a having positive refracting power and constituting an objective lens system 30 together with a front diaphragm 35 and a convex lens 36 placed coaxially therewith; a total reflection surface 31b, and an emergent surface 31c having positive refracting power and constituting a field lens system together with an incident surface 32a of a transmissive prism 32 disposed coaxially therewith.

As advantages particular to the third embodiment, since the field lens system is constituted by a plurality of surfaces, the power thereof is increased, and as a result, the objective lens system 30 can be further reduced in size.

Moreover, since all four reflections (two of them by roof faces) are total reflections, light loss due to reflection does not occur.

The incident angles θ formed by all the total reflection surfaces with respect to the light on the optical axis and the light parallel to the optical axis (the angles formed by the surfaces with respect to the normals thereto) satisfy the following condition:

$$45°<\theta<60°$$

Since this allows even a thick light beam (even when the principal ray is inclined) to be totally reflected, it is possible to provide a bright finder that has a large pupil diameter, that is, that is easy to look through.

As described above, according to the embodiments of the present invention, it is possible to achieve a compact real-image finder that allows easy observation and that is easily applicable to an optical device, such as a camera.

In particular, since the objective lens system, the reflecting member, the transmissive prism, the reflecting prism, and the eyepiece are placed in that order from the object side in the real-image finder of the present invention, it is possible to decrease the angle a at which the light beam bent by the reflecting member is guided toward the observer (the eyepiece) by the transmissive prism and the reflecting prism, and to thereby reduce the size of the finder in the longitudinal direction, e.g., in the direction of thickness when the finder is applied to a camera.

Furthermore, since the reflecting member is placed in front of the image plane of the objective lens system, and the transmissive prism and the reflecting prism are placed in the rear of the image plane in the above arrangement, it is possible to make the distance between the objective lens system and the image plane relatively short, and to properly set the power of the finder. This allows even a high-power finder to be configured in good balance.

Modifications

The objective lens systems in the above embodiments are just examples, and may be, of course, replaced with a zoom lens, or a single focus lens. In particular, in the case of the single focus lens, when a roof surface is disposed in a reflecting prism, as in the second and third embodiments, this is satisfactory when only a single component (single lens element) other than the prism in the objective lens system has refracting power. In the second and third embodiments, when the emergent surface of the reflecting prism is coaxial with the eyepiece and has positive refracting power, it is possible to place the principal point of the eyepiece lens system more to the front. Therefore, even when the optical system has a long optical axis because the roof surface is formed in the reflecting prism, it is possible to increase the power of the finder (to widen the angle of view).

Next, an example of a photographing device including the real-image finder of the present invention, which has been described in conjunction with FIGS. 1, 3, 5, etc., will be described with reference to FIGS. 6A and 6B.

Figure 6A:
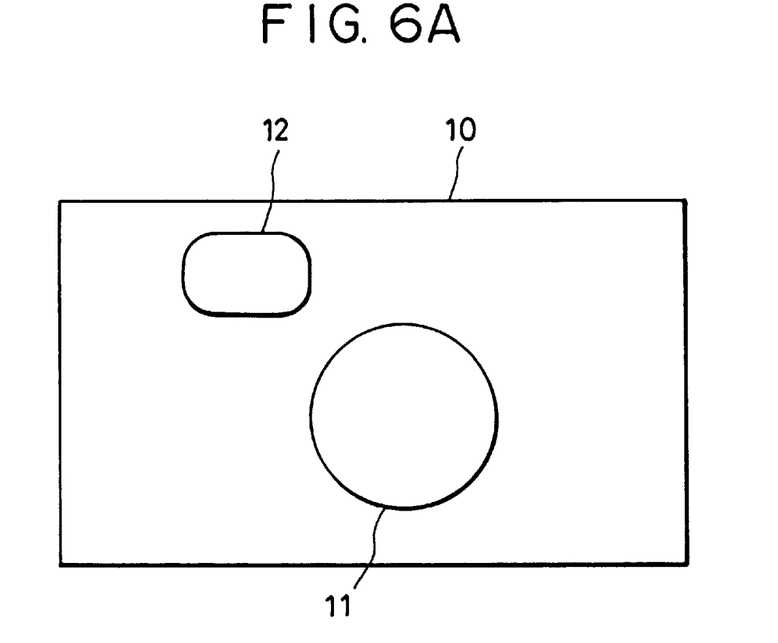
FIGS. 6A and 6B are schematic structural views of a photographing device including a real-image finder of the present invention.
Figure 6B:
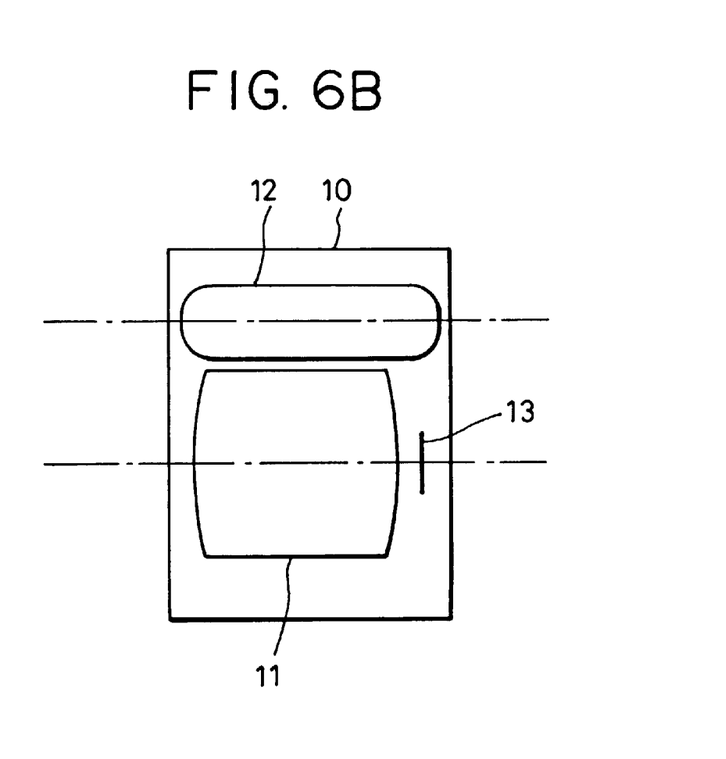

FIGS. 6A and 6B are front and side sectional views of the photographing device, respectively. The photographing device comprises a main body (housing) 10, a photographing optical system 11 including a zoom lens and the like, a finder optical system 12 serving as the real-image finder of the present invention, and a film 13 serving as a photosensitive surface.

Such application of the real-image finder of the present invention to the photographing device allows a compact and high-performance photographing device to be produced.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A real-image finder comprising:
   an objective optical system for forming a real image;
   a reflecting member having a reflecting surface for reflecting light from said objective optical system;
   a transmissive prism for transmitting light from said reflecting member, said transmissive prism having only two optically active surfaces, including an incident surface on which a light beam on the optical axis of said objective optical system deflected by said reflecting member is nearly perpendicularly incident, and an emergent surface placed at an angle to said incident surface;
   a reflecting prism on which light from said transmissive prism is incident, said reflecting prism having an incident surface placed close to said emergent surface of said transmissive prism, a reflecting surface for reflecting light from said incident surface so that the light from said reflecting surface is totally reflected by said incident surface, and an emergent surface through which the light totally reflected by said incident surface is directly emitted; and
   an eyepiece optical system for guiding light from said reflecting prism to an observer.

2. A real-image finder according to claim 1, wherein a light beam on the optical axis of said objective optical system that is incident on said reflecting member is parallel to a light beam on the optical axis of said objective optical system totally reflected by said incident surface of said reflecting prism.

3. A real-image finder according to claim 1, wherein said reflecting surface of said reflecting member is a roof surface.

4. A real-image finder according to claim 1, wherein said reflecting surface of said reflecting prism is a roof surface.

5. A real-image finder according to claim 1, wherein an angle α formed by the light that is incident on said reflecting surface of said reflecting prism and the light reflected therefrom satisfies the following condition:

$$5°<\alpha<35°.$$

6. A real-image finder according to claim 1, wherein said incident surface of said transmissive prism has refracting power.

7. A real-image finder according to claim 1, wherein said reflecting member is a prism.

8. A real-image finder according to claim 7, wherein at least one of an incident surface and an emergent surface of said reflecting member prism has refracting power.

9. A real-image finder according to claim 7, wherein a reflecting surface of said reflecting member prism functions as a total reflection surface.

10. A real-image finder according to claim 9, wherein an incident angle θ at which a light beam on the optical axis of said objective optical system is incident on said total reflection surface satisfies the following condition:

$$45°<\theta<60°$$

11. A real-image finder according to claim 1, wherein the real image is formed between said reflecting member and said transmissive prism.

12. An optical device having a real-image finder, wherein said real-image finder comprises:
an objective optical system for forming a real image;
a reflecting member having a reflecting surface for reflecting light from said objective optical system;
a transmissive prism for transmitting light from said reflecting member, said transmissive prism having only two optically active surfaces, including an incident surface on which a light beam on the optical axis of said objective optical system deflected by said reflecting member is nearly perpendicularly incident, and an emergent surface placed at an angle to said incident surface;
a reflecting prism on which light from said transmissive prism is incident, said reflecting prism having an incident surface placed close to said emergent surface of said transmissive prism, a reflecting surface for reflecting light from said incident surface so that the light from said reflecting surface is totally reflected by said incident surface, and an emergent surface through which the light totally reflected by said incident surface is directly emitted; and
an eyepiece optical system for guiding light from said reflecting prism to an observer.

13. An optical device according to claim 12, wherein a light beam on the optical axis of said objective optical system that is incident on said reflecting member is parallel to a light beam on the optical axis of said objective optical system totally reflected by said incident surface of said reflecting prism.

14. An optical device according to claim 12, wherein said reflecting surface of said reflecting member is a roof surface.

15. An optical device according to claim 12, wherein said reflecting surface of said reflecting prism is a roof surface.

16. An optical device according to claim 12, wherein an angle α formed by the light that is incident on said reflecting surface of said reflecting prism and the light reflected therefrom satisfies the following condition:

$$5°<\alpha<35°.$$

17. An optical device according to claim 12, wherein said incident surface of said transmissive prism has refracting power.

18. An optical device according to claim 12, wherein said reflecting member is a prism.

19. An optical device according to claim 18, wherein at least one of an incident surface and an emergent surface of said reflecting member prism has refracting power.

20. An optical device according to claim 18, wherein a reflecting surface of said reflecting member prism functions as a total reflection surface.

21. An optical device according to claim 20, wherein an incident angle θ at which a light beam on the optical axis of said objective optical system is incident on said total reflection surface satisfies the following condition:

$$45°<\theta<60°.$$

22. An optical device according to claim 12, wherein the real image is formed between said reflecting member and said transmissive prism.

23. A real-image finder comprising:
an objective optical system for forming a real image;
a reflecting member having a reflecting surface for reflecting light from said objective optical system;
a transmissive prism for transmitting light from said reflecting member, said transmissive prism having an incident surface on which a light beam on the optical axis of said objective optical system deflected by said reflecting member is nearly perpendicularly incident, and an emergent surface placed at an angle to said incident surface;
a reflecting prism on which light from said transmissive prism is incident, said reflecting prism having an incident surface placed close to said emergent surface of said transmissive prism, and a reflecting surface for reflecting light from said incident surface so that the light from said reflecting surface is totally reflected by said incident surface; and
an eyepiece optical system for guiding light from said reflecting prism to an observer,
wherein an angle α formed by the light that is incident on said reflecting surface of said reflecting prism and the light reflected therefrom satisfies the following condition:

$$5°<\alpha<35°.$$

24. A real-image finder comprising:
an objective optical system for forming a real image;
a reflecting member having a reflecting surface for reflecting light from said objective optical system;
a transmissive prism for transmitting light from said reflecting member, said transmissive prism having an incident surface on which a light beam on the optical axis of said objective optical system deflected by said reflecting member is nearly perpendicularly incident, and an emergent surface placed at an angle to said incident surface;
a reflecting prism on which light from said transmissive prism is incident, said reflecting prism having an incident surface placed close to said emergent surface of said transmissive prism, and a reflecting surface for reflecting light from said incident surface so that the light from said reflecting surface is totally reflected by said incident surface; and
an eyepiece optical system for guiding light from said reflecting prism to an observer,
wherein said reflecting member is a prism, and
wherein at least one of an incident surface and an emergent surface of said reflecting member prism has refracting power.

25. An optical device having a real-image finder, wherein said real-image finder comprises:
an objective optical system for forming a real image;
a reflecting member having a reflecting surface for reflecting light from said objective optical system;

a transmissive prism for transmitting light from said reflecting member, said transmissive prism having an incident surface on which a light beam on the optical axis of said objective optical system deflected by said reflecting member is nearly perpendicularly incident, and an emergent surface placed at an angle to said incident surface;

a reflecting prism on which light from said transmissive prism is incident, said reflecting prism having an incident surface placed close to said emergent surface of said transmissive prism, and a reflecting surface for reflecting light from said incident surface so that the light from said reflecting surface is totally reflected by said incident surface; and an eyepiece optical system for guiding light from said reflecting prism to an observer, wherein said incident surface of said transmissive prism has refracting power.

26. An optical device having a real-image finder, wherein said real-image finder comprises:

an objective optical system for forming a real image;

a reflecting member having a reflecting surface for reflecting light from said objective optical system;

a transmissive prism for transmitting light from said reflecting member, said transmissive prism having an incident surface on which a light beam on the optical axis of said objective optical system deflected by said reflecting member is nearly perpendicularly incident, and an emergent surface placed at an angle to said incident surface;

a reflecting prism on which light from said transmissive prism is incident, said reflecting prism having an incident surface placed close to said emergent surface of said transmissive prism, and a reflecting surface for reflecting light from said incident surface so that the light from said reflecting surface is totally reflected by said incident surface; and an eyepiece optical system for guiding light from said reflecting prism to an observer, wherein said reflecting member is a prism, and wherein at least one of an incident surface and an emergent surface of said reflecting member prism has refracting power.

* * * * *

UNITED STATES PATENT AND TRADEMARK OFFICE
CERTIFICATE OF CORRECTION

PATENT NO. : 6,282,381 B1
DATED : August 28, 2001
INVENTOR(S) : Takeshi Koyama

Page 1 of 1

It is certified that error appears in the above-identified patent and that said Letters Patent is hereby corrected as shown below:

Column 5,
Line 35, "a" should read -- α --.

Column 7,
Line 11, "45° < θ < 60°" should read -- 45° < θ < 60°. --.

Signed and Sealed this

Second Day of April, 2002

Attest:

JAMES E. ROGAN
Attesting Officer       Director of the United States Patent and Trademark Office